United States Patent [19]

Nepela et al.

[11] Patent Number: 5,359,480
[45] Date of Patent: Oct. 25, 1994

[54] MAGNETIC HEAD AIR BEARING SLIDER

[75] Inventors: Daniel A. Nepela, San Jose; Chak M. Leung, Palo Alto; Ciuter Chang, Fremont, all of Calif.

[73] Assignee: Read-Rite Corporation, Milpitas, Calif.

[21] Appl. No.: 993,438

[22] Filed: Dec. 21, 1992

[51] Int. Cl.⁵ .................... G11B 5/60; G11B 5/48
[52] U.S. Cl. ............................... 360/103; 360/104
[58] Field of Search ............... 360/103, 104, 122, 123

[56] References Cited

U.S. PATENT DOCUMENTS 5,062,017 10/1991 Strom et al. ................... 360/103
5,086,360 2/1992 Smith et al. ................... 360/103

FOREIGN PATENT DOCUMENTS 62-16215  1/1987 Japan ................... 360/122
62-279515 12/1987 Japan ................... 360/103
1-50217  2/1989 Japan ................... 360/103

Primary Examiner—John H. Wolff
Assistant Examiner—Allen Cao
Attorney, Agent, or Firm—Nathan N. Kallman

[57] ABSTRACT

An air bearing slider of a thin film magnetic head assembly is configured with tapered portions at its leading edge and with two side rails extending from the tapers to the trailing edge of the slider. Recesses that are formed in the rails are spaced from the tapered portions. Each rail may be configured with one or more recesses. In one embodiment, the two recesses of each rail are asymmetrically disposed relative to the tapered portion of the rail and to the trailing edge of the slider. In such embodiment, the recesses do not extend to the slider trailing edge. In alternative embodiments, the recesses are spaced from the tapered portions but extend to the trailing edge of the slider. The recesses may be arcuately shaped or have angled portions or other geometries.

6 Claims, 3 Drawing Sheets

MAGNETIC HEAD AIR BEARING SLIDER

FIELD OF THE INVENTION

This invention relates to air bearing head sliders used in disk drives.

DESCRIPTION OF THE PRIOR ART

Magnetic head assemblies that fly relative to rotating magnetic disks are used extensively in disk drives for recording and reading data. One objective when using flying heads in a transducing relationship with a magnetic recording disk is to obtain a very close spacing between the head slider and the disk surface. By maintaining a close spacing, it is possible to record short wavelength or high frequency signals thereby realizing high density and high storage capacity data recording. It is highly desirable to fly the head slider at a substantially constant flying height relative to the disk surface, since variations in head-to-disk spacing adversely affect signal amplitude and resolution.

It is known that in disk drives which use rotary actuators for accessing the heads to selected data tracks on the disk surface, the orientation or skew of the head slider varies as the head is moved between the inner diameter (ID) and outer diameter (OD) of the disk surface. Variations in skew result in changes of the pressure contour along the air bearing surface (ABS) of the head slider, which in turn causes undesirable changes in the pitch, roll and flying height of the head that also adversely affects data signal being processed.

Air bearing sliders used in disk drives typically have a leading edge and a trailing edge at which thin film transducers are deposited. Generally, the sliders have tapered portions at the leading edge and longitudinal rails that extend from the tapers to the trailing edge. The tapers may be shaped and of such length as to provide fast takeoff of the slider from a rest position to a flying attitude relative to the disk with controlled pitch. The dimensions and shapes of the tapers and rails are instrumental in determining the flying characteristics of the head. The rail design determines whether negative pressure or positive pressure is generated at certain points or if transverse pressure is created across the width of the slider. In effect, the pressure contour across the slider contributes to the flying characteristics, including flying height and pitch and roll of the head relative to a rotating disk.

SUMMARY OF THE INVENTION

An object of this invention is to provide a magnetic head air bearing slider having a substantially constant flying height during operation in a disk drive.

Another object of this invention is to provide a magnetic head air bearing slider that avoids changes in flying height with changes in disk radius during track accessing.

Another object is to provide a magnetic head air bearing slider for use in a disk drive having a rotary actuator wherein the effects of skew and disk rotational speed are minimized.

A further object is to provide a magnetic head air bearing slider for a disk drive wherein data bits are recorded at substantially equal spacing and with uniform density independent of disk radius.

According to this invention, a magnetic head air bearing slider comprises an air bearing surface having tapers at its leading edge and side rails extending from the tapers towards the trailing edge of the slider. In one embodiment, the slider has two rails, each rail having two recesses of different dimensions, the recesses being spaced from the leading and trailing edges of the slider. In a preferred embodiment, the two recesses of each rail are asymmetrically disposed and not aligned relative to each other. The recesses are substantially rectangular in shape and the two recesses in each rail have different widths. In other embodiments, the recesses extend to the trailing edge of the slider and are also spaced from the end of the tapers. The shapes of the recesses may be arcuate, crescent shaped or have angled portions.

BRIEF DESCRIPTION OF THE DRAWINGS

The invention will be described in greater detail with reference to the drawing in which.

DETAILED DESCRIPTION OF THE INVENTION

Figure 1:
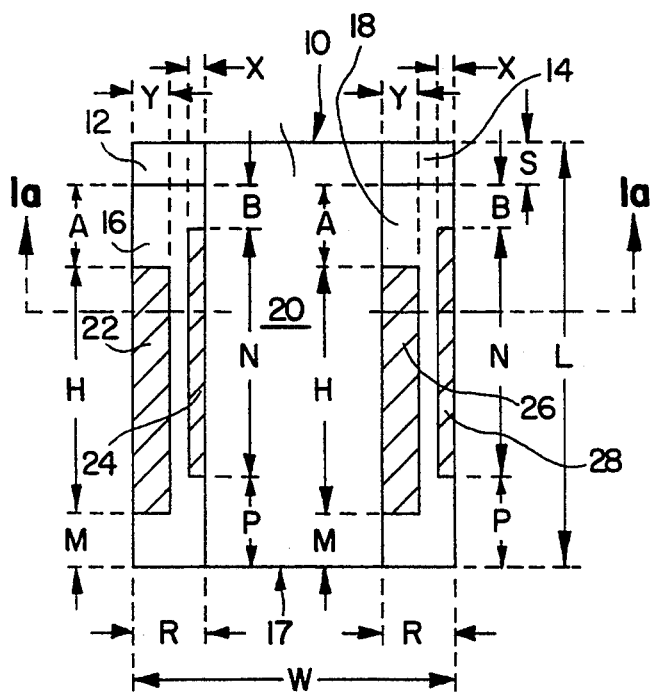
FIG. 1 is a representational plan view of the ABS of a head slider, made in accordance with this invention.
Figure 1A:
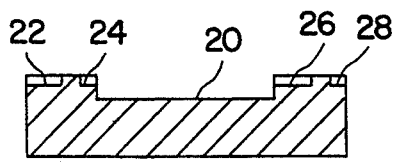
FIG. 1a is a cross-sectional view of FIG. 1 taken along line Aa—Aa.

With reference to FIGS. 1 and 1a, an air bearing slider 10 is formed with tapered portions 12 and 14 at the leading edge 15 of the slider. The slider 10 is preferably made of a nonmagnetic ceramic material, such as aluminum oxide/titanium carbide or silicon carbide. Longitudinal rails 16 and 18 extend from the ends of the tapered portions to the trailing edge 17 of the slider. A central recessed section 20 is provided between the two rails 16 and 18. The recessed section 20 is formed by sawing or ion milling or other atomic scale etching techniques and is about 0.003 inch deep relative to the top surfaces of the adjacent rails.

The air bearing head slider is formed from a substantially rectangular block 10, made of a nonmagnetic ceramic material by way of example. Thin film transducers are deposited at the ends of the rails 16 and 18. The transducing gaps of the transducers are flush with the slider ABS. During operation of a disk drive, a flexure that is formed with a head suspension and which supports the head slider is translated by a load force towards the surface of a rotating magnetic disk. The rotation of the disk generates a thin air lubricating film that causes the head to fly and to be spaced from the disk surface by a very small distance.

In accordance with this invention, side rail 16 is configured with an outer wide recess 22 and an inner narrow recess 24 of variable length within a defined range of lengths H and N. Rail 18 is configured with an inner wide recess 26 and outer narrow recess 28. The recesses are formed by chemical or reactive ion etching or ion milling to a depth of about 40 microinches. Recesses 22 and 26 are relatively wide and are about 2.5 times as wide as recesses 24 and 28. Recesses 22 and 26 can have different widths and recesses 24 and 28 can have different widths. Each recessed area 22, 24, 26 and 28 is spaced at predetermined distances A and B from the leading edge of the slider. The following defines the reference characters used in the drawing:

Distance of wider recess to taper corner: A

Distance of narrow recess to taper corner: B

Overall length of slider: L
Overall width of slider: W
Length of wide recesses: H
Width of wide recesses: Y
Length of narrow recesses: N
Width of narrow recesses: X
Distance from wide recesses to trailing edge: M
Distance from narrow recesses to trailing edge: P
Width of rails and tapers: R
Length of tapers: S
Taper angle: 20'-60'
Step depth: 20-60 microinches
Step wall angle slope: 0.5° to 80°.

With the design of FIGS. 1 and 1a, optimal performance for skew, velocity independent flying height is achieved with the following preferred dimensions:
With the embodiment of FIGS. 1 and 1a, the asymmetrical etched portions over parts of the rails provide better pitch control and pitch stiffness. With an increased area of air bearing surface at the rear end of the slider, air bearing stiffness is increased. Less sensitivity to skew angle and to the rotational speed of the disk was experienced with this design, particularly at the disk OD where linear speed of the rotating disk and skew angle are highest. The disclosed configuration combines negative pressure and transverse pressure effects. The high pressure around the trailing edge of the slider is not affected by variations in step depth. Furthermore, the slider design is less sensitive to manufacturing tolerances than prior art sliders and in particular affords a higher degree of design freedom.

Figure 1B:
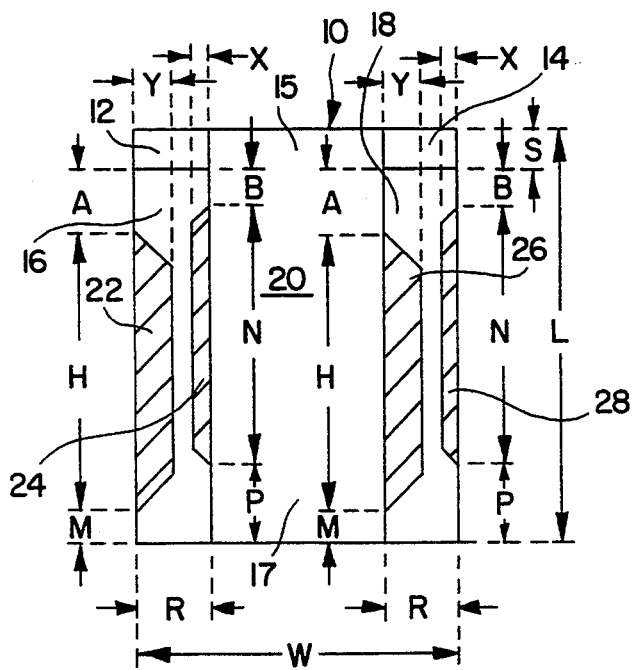
FIG. 1b is a representational view of the ABS of a modified design of the head slider of FIG. 1.

FIG. 1b depicts a slider having substantially the same geometry as the slider of FIG. 1, except that the recesses have angled ends instead of square ends.

Figure 2:
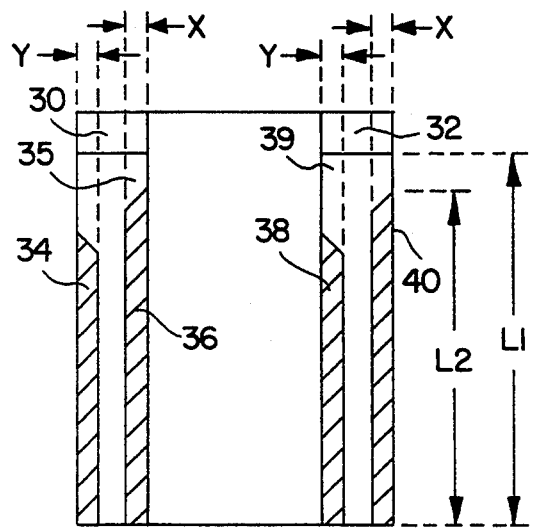
FIGS. 2–10 depict alternative embodiments of ABS configurations incorporating the invention.
Figure 3:
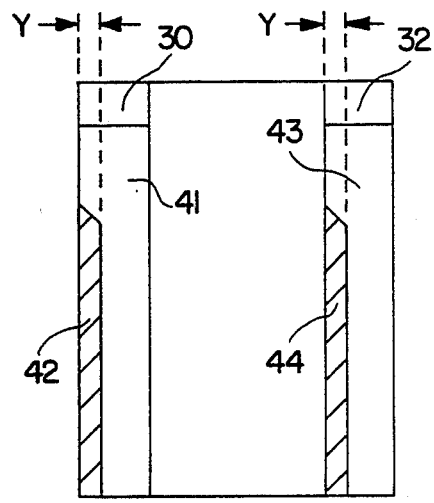

FIGS. 2-5 delineate alternative ABS configurations that may be used with different head suspensions, load forces and disk rotating speeds to accomplish controlled pitch and rapid takeoff of the slider. FIG. 2 shows an embodiment in which each rail has two recesses 34, 36 and 38, 40 respectively. The recesses are substantially rectangular and have angled front ends. The etched recesses are spaced from the tapers 30 and 32 following the teaching of this invention. The rails extend to the trailing edge of the slider. FIG. 3 is a modified version of the slider of FIG. 2 wherein each side rail has a single recess 42 and 44 respectively. The recessed portions 42 and 44 are spaced from the tapers 30 and 32 and extend to the trailing edge of the slider. The etched recesses 42 and 44 have angled portions at the front ends. Recess 42 is located at the outer edge of the rail at one side of the slider and recess 44 is located at the inner edge of the other rail adjacent to the central recessed section.

Figure 4:
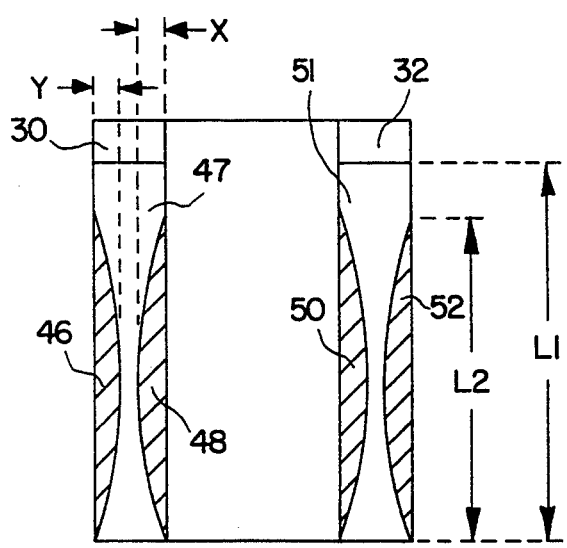
Figure 5:
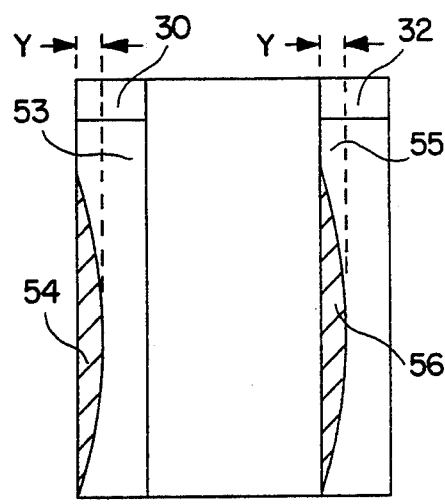

FIG. 4 illustrates the ABS of a slider having side rails with a pair of arcuate or crescent-shaped recesses 46, 48 and 50, 52 respectively at the outer and inner edges of the rails. The arcuate recesses are spaced from the tapers 30 and 32 and extend to the trailing edge of the slider. FIG. 5 shows a similar ABS geometry as in FIG. 4, except that single recesses 54 and 56 are used for each rail 53 and 55 respectively. The parameters for the slider configurations of FIGS. 2-5 are substantially similar to those described with reference to FIG. 1.

Figure 6:
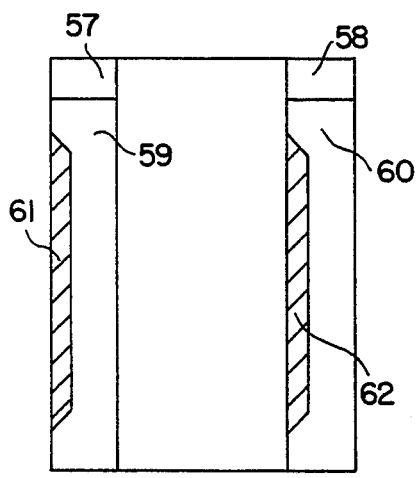

FIG. 6 represents an alternative design having front end tapers 57 and 58 with rails 59 and 60 extending fully to the slider trailing edge and single recessed portions 61 and 62 extending partly towards the slider trailing edge.

Figure 7:
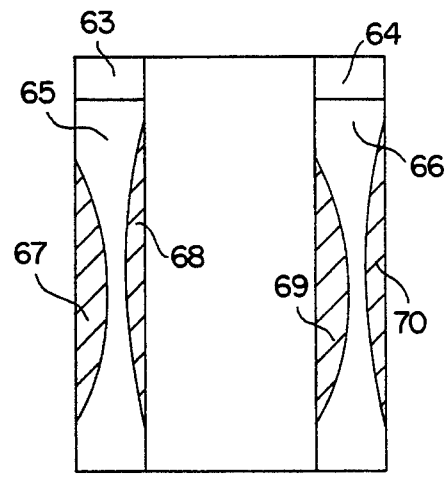
Figure 8:
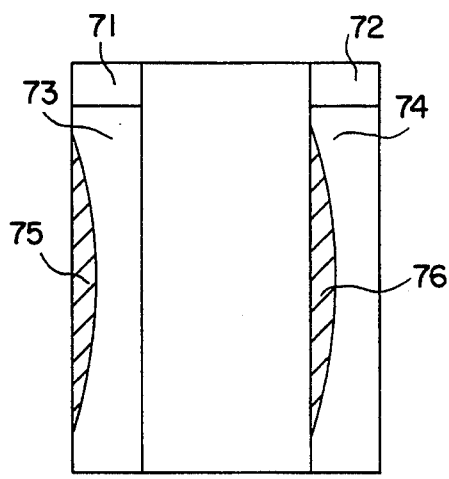

FIGS. 7-8 illustrate other slider designs wherein the recessed portions extend only partly towards the trailing edge of the slider. The slider of FIG. 7 includes two arcuately shaped recessed portions 67 and 68 in rail 65 and similar recessed portions 69 and 70 in rail 66. The recessed portions are spaced from the leading edge tapers 63 and 64. The slider of FIG. 8 has only one arcuate recessed portion 75 and 76 respectively in rails 73 and 74, the recessed portions being spaced from the tapers 71 and 72. In these slider configurations in which the recessed portions do not extend to the slider trailing edge, there is lessened possibility of interference by the transducer at the trailing end of the slider with the fabrication of the slider.

Figure 9:
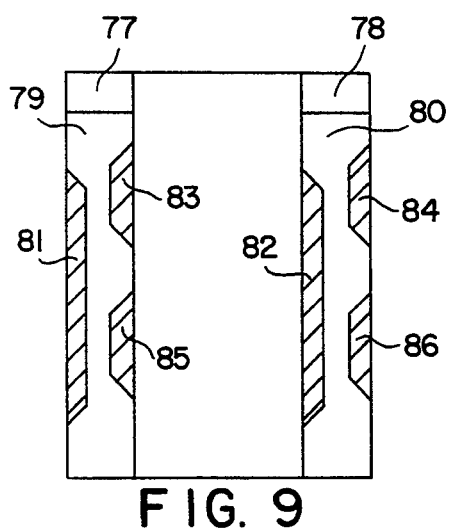
Figure 10:
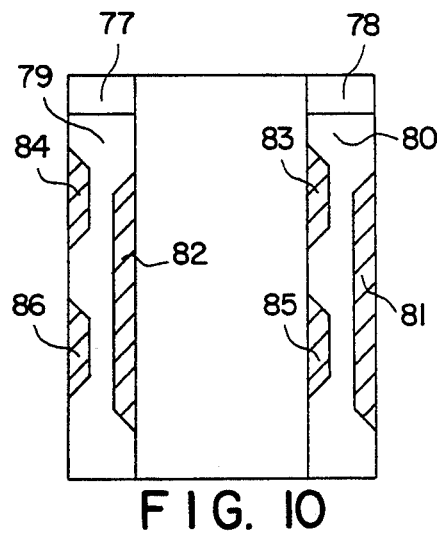

FIGS. 9 and 10 represent alternative versions of the slider design of FIG. 1. In FIG. 9, tapers 77 and 78 are followed by rails 79 and 80. The rail 79 has a recessed portion 81 at its outer side and split recessed portions 83 and 85 at its inner side. Rail 80 has an inner recessed portion 82 similar to recessed portion 81 and split recessed portions 84 and 86 similar to recesses 83 and 85 respectively. The slider design of FIG. 10 is a mirror image of the slider of FIG. 9. The designs of Figs. 9 and 10 allows further degrees of freedom for skew and velocity independent flying height features, thereby providing the designer more latitude in achieving tight design specifications of flying height versus skew and velocity in rotary actuator type disk drive designs.

During operation of a disk drive while the head slider is flying relative to a rotating disk, a negative pressure is created as the air enters the recessed region at zero skew. The negative pressure, which depends on the angle of the recess relative to air flow direction, is at a maximum for zero skew. Similarly at the exit of the recessed region, a positive pressure is created which progressively diminishes as the angle of the air flow relative to the angle of the exiting recessed region changes. The presence of asymmetry increases the degrees of freedom which is advantageous for achieving a substantially uniform flying height of the transducer across the disk. In effect, as the skew angle changes, the leading and trailing angles of the recess have the effect of changing the amount of negative and positive pressure so that uniform flying height of the transducer is realized.

The novel slider disclosed herein having partially etched rails, which are spaced from the front tapers, is designed to experience a greater moment of lift and rapid takeoff of the slider. The fast liftoff is made possible even at lower rotational speeds of the disk. The slider flying height is insensitive to skew at different radii in rotary actuator drives, and the slider is less sensitive to the depth of the etched recessed portions.

What is claimed is:

1. An air bearing slider for a thin film magnetic head having an air bearing surface with a leading edge and a trailing edge defining the length of said slider therebetween and first and second opposing sides extending from said leading edge to said trailing edge defining the width of said slider comprising:

at least first and second tapered portions at its leading edge;

first and second side rails each having an outer edge along said first and second opposing sides of said slider and an inner edge extending respectively from said tapered portions to said trailing edge of said slider, and a central recessed section between said inner edges of said side rails;

a first one of said side rails having at least one outer recess along said first opposing side of said slider and at least one inner recess along said inner edge of said first side rail adjacent to said central recessed section; a second one of said side rails having at least one outer recess along said second opposing side of said slider and at least one inner recess along the inner edge of said second rail adjacent to said central recessed section;

said outer and inner recesses being spaced from said tapered portions, said outer recess of said first rail and said inner recess of said second rail being nonaligned relative to said inner recess of said first rail and said outer recess of said second rail with reference to said width of said slider, so that said recesses of said side rails are disposed asymmetrically relative to the width or lateral dimension of said slider.

2. An air bearing slider as in claim 1, wherein said outer recess of said first rail and said inner recess of said second rail are substantially in alignment transversely across said slider, and said inner recess of said first rail and said outer recess of said second rail are substantially in alignment transversely across said slider.

3. An bearing slider as in claim 1, wherein said outer recess of said first rail and the inner recess of said second rail having substantially the same first width, and the inner recess of said first rail and the outer recess of said second rail having substantially the same second width, said second width being narrower than said first width.

4. An air bearing slider as in claim 1, wherein said inner recess of said first rail and said outer recess of said second rail are spaced a first distance from said tapered portions, and said outer recess of said first rail and said inner recess of said second rail are spaced a second distance from said tapered portions, said first distance and said second distance being different.

5. An air bearing slider as in claim 1, wherein said recesses are etched.

6. An air bearing slider as in claim 1, wherein said outer recess of said first rail is wider than said inner recess of said first rail, and said inner recess of said second rail is wider than said outer recess of said second rail.

* * * * *